United States Patent [19]

Hofer

[11] Patent Number: 4,732,553
[45] Date of Patent: Mar. 22, 1988

[54] SEAL CONSTRUCTION FOR A MOLD STRUCTURE FOR ENCAPSULATING GLASS WITH A GASKET

[75] Inventor: Peter H. Hofer, Perrysburg, Ohio

[73] Assignee: Libbey-Owens-Ford Co., Toledo, Ohio

[21] Appl. No.: 69,890

[22] Filed: Jul. 6, 1987

[51] Int. Cl.[4] .............................................. B29C 39/10
[52] U.S. Cl. ..................................... 425/116; 249/65; 249/83; 277/34; 277/226; 425/127
[58] Field of Search .................... 277/34, 34.3, 34.6, 277/226; 425/116, 117, 127, 520; 249/83, 65

[56] References Cited

U.S. PATENT DOCUMENTS

| | | | |
|---|---|---|---|
| 2,814,517 | 11/1957 | Razdow | 277/226 |
| 2,914,350 | 11/1959 | Smith | 277/226 |
| 3,061,895 | 11/1962 | Kleinhans | 277/226 |
| 3,171,381 | 3/1965 | Meek | 277/34 |
| 3,263,014 | 7/1966 | Deisenroth | 425/127 |
| 3,423,769 | 1/1969 | Cowley | 277/34.3 |
| 4,371,175 | 2/1983 | Van Dyk | 277/226 |
| 4,561,625 | 12/1985 | Weaver | 425/116 |
| 4,584,155 | 4/1986 | Zanella | 425/127 |
| 4,626,185 | 12/1986 | Monnet | 425/116 |

Primary Examiner—Willard Hoag
Attorney, Agent, or Firm—Marshall & Melhorn

[57] ABSTRACT

A unique dynamic seal assembly is used in a mold structure for encapsulating a glass window assembly with a gasket. The seal assembly resiliently supports the window assembly and cooperates with the mold structure for defining a gasket forming cavity. The mold structure typically includes two cooperating mold sections, each of which can be provided with a groove for receiving a separate dynamic seal assembly. Each seal assembly includes a sealing body having a sealing surface which faces and is adapted to sealingly contact the window assembly. The seal assembly also includes a first fluid filled bladder positioned between the sealing body and a bottom of the groove in the mold section. When increased pressure is applied to a local area of the seal as a result of a contour difference between the seal and the window assembly, the bladder deforms to automatically transfer at least a portion of the applied pressure to adjacent areas of the seal. A second fluid filled bladder is positioned between the sealing body and a side wall of the groove to force the sealing body against the opposite side wall of the groove. The sealing body can be provided with a strip of Teflon material for sealing against the side wall of the groove.

24 Claims, 7 Drawing Figures

SEAL CONSTRUCTION FOR A MOLD STRUCTURE FOR ENCAPSULATING GLASS WITH A GASKET

BACKGROUND OF THE INVENTION

The present invention relates to a seal assembly for use in an injection molding process and, more particularly, to a seal assembly for use in a mold for making encapsulated window structures.

Initially, fixed window assemblies for vehicles were comprised of a plurality of elements including adhesive sealants applied around the marginal edges of a glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These window assemblies included a sheet of glass, an adjacent frame, and a casing or gasket of molded material, such as polyvinylchloride, extending between the frame and the peripheral edge of the window to hold the sheet of glass and the frame together. Fasteners were provided at spaced locations along the frame such that the entire assembly could be guided into a location over the opening in a vehicle body as a unit. Other types of unitary window assemblies are disclosed in U. S. Pat. Nos. 3,759,004 and 4,364,595. While such unitary window structures greatly reduce the time required to mount the window assembly in an associated vehicle, such structures are relatively costly, since the individual components required to produce each window assembly generally must be manually assembled.

Recently, window assemblies have been formed by encapsulating at least a portion of the periphery of a sheet of glass with a gasket material. Typically, the gasket is formed by curing a polymeric gasket-forming material in situ on the glass sheet to encapsulate a predetermined portion of the marginal edge of the sheet. The gasket can be polyurethane and formed, for example, by a reaction injection molding process.

A mold structure which can be utilized to encapsulate a glass sheet with an integrally molded gasket is disclosed in U.S. Pat. No. 4,561,625 issued to W. R. Weaver and assigned to the assignee of the present invention. In this patent, the mold structure includes at least two mold sections having facing surfaces cooperating to define a chamber for receiving a glass sheet. A resilient seal means is positioned in at least one of the mold sections about at least a portion of the periphery of the chamber and functions to resiliently support the glass sheet within the chamber. Each mold section includes a metallic main body portion, and the seal means maintains at least the portion of the glass sheet located inwardly of the seal means in spaced-apart relationship with the metallic main body portions of the mold sections.

Also, in the Weaver patent, the seal means cooperates with predetermined portions of the glass sheet and the mold sections for defining a gasket forming cavity having a configuration corresponding to the gasket to be formed on the glass sheet. At least a portion of the facing surfaces of the mold sections disposed outwardly of the gasket forming cavity are in metal-to-metal contact with one another. This enables the amount the seal means is compressed and the dimensions of the gasket to be controlled.

The prior art seals are typically deformable, static silicone rubber or Teflon coated elastomeric seals. In order to accommodate differences in contour or edge profile which occur between individual glass sheets, these seals must be deformed sufficiently to fill "low spots" and prevent gaps between the glass and the seal which would cause excessive flash formation on the gasket being molded. This deformation causes very high pressure on the high spots, resulting in seal fatigue and leading to premature seal failure. In some instances, the excessive pressure may cause breakage of the glass sheet. In all cases excess pressure distorts the seal contour resulting in distorted molded gasket shapes.

SUMMARY OF THE INVENTION

The present invention relates to a unique seal assembly for a mold structure for molding a gasket in situ around the periphery of a glass window assembly. The seal assembly is adapted to resiliently support the window assembly within the mold structure and cooperates with the mold structure for defining a gasket forming cavity. The seal structure of the present invention is dynamic and includes a fluid filled bladder which automatically compensates for pressure differentials caused by low and high spots in the sheet of glass. With the present invention, excessive pressure generated at a high spot on the glass is transferred to an adjacent low spot to equalize the pressure along the whole length of the seal.

More specifically, the mold structure typically includes two cooperating mold sections, each of which can be provided with a groove for receiving a separate dynamic seal assembly. Each seal assembly includes a sealing body constructed of a deformable, non-compressible material and having a sealing surface which faces and is adapted to sealingly contact the window assembly. In accordance with the present invention, the seal assembly also includes a first fluid filled bladder positioned between the sealing body and a bottom wall of the groove in the cooperating mold section. When increased pressure is applied to a local area of the seal as a result of a contour difference between the seal and the window assembly, the bladder deforms to automatically transfer at least a portion of the applied pressure to adjacent areas of the seal. Such a seal construction produces a more effective seal and reduces seal fatigue, thereby increasing the life of the seal, and assures molding an undistorted, true to design, molded gasket.

The seal assembly also includes a second fluid filled bladder positioned between the sealing body and a side wall of the groove in the cooperating mold section. When inflated, the second bladder forces the sealing body against the opposite side wall of the groove to prevent the gasket forming material from entering the groove and forming flash on the gasket. Both of the first and second bladders can be formed as flat tubes having reinforced sidewall construction to preclude elongation or stretching during prolonged use. In an alternate embodiment, a Teflon strip is employed between the sealing body and the wall of the channel opposite the second bladder.

It is accordingly an object of the invention to produce an inflatable encapsulation seal useful in the production of flash-free plastic material encapsulated products. The resultant seal structure may be satisfactorily utilized in the production of encapsulated glass sheet products to provide the desired flash-free product without subjecting the glass assembly to excessive stresses which might otherwise cause breakage of the glass.

BRIEF DESCRIPTION OF THE DRAWINGS

The above, as well as other advantages of the present invention, will become readily apparent to those skilled in the art from the following detailed description of the preferred embodiments when considered in the light of the accompanying drawings, in which.

DESCRIPTION OF THE PREFERRED EMBODIMENT

Figure 1:
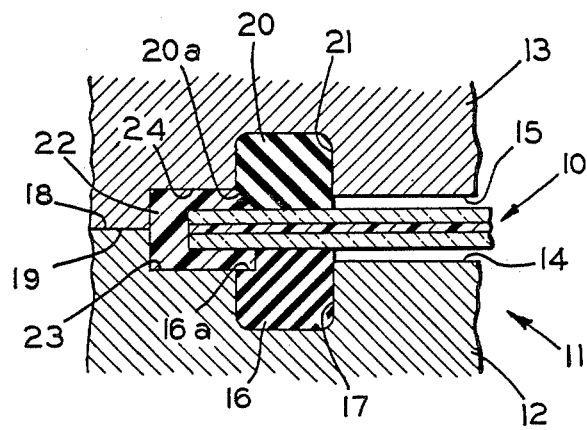
FIG. 1 is a fragmentary sectional view of a prior art window assembly and mold structure.

There is shown in FIG. 1 a window assembly 10 positioned within a mold structure 11 utilizing a seal according to a prior art mold structure of the type disclosed in above-mentioned U.S. Pat. No. 4,561,625, which is herein incorporated by reference. The mold structure 11 includes a lower section 12 and an upper section 13 which are coupled to suitable means (not shown) for opening and closing the mold sections 12 and 13. The mold structures 12 and 13 are typically formed of a rigid material such as, for example, steel or aluminum. Also, each of the mold sections 12 and 13 can be provided with passageways (not shown) for circulating a suitable coolant or heating fluid through the respective mold sections.

The mold sections 12 and 13 are provided with recessed portions 14 and 15 respectively in facing relationship to one another such that, when the mold sections are closed, the recessed portions 14 and 15 cooperate to define a sheet receiving or glass clearance chamber for receiving the window assembly 10 on which a gasket is to be formed. When the mold sections are open, the window assembly 10 is positioned on the lower section 12 so that the outer peripheral portion of the lower surface of the glass rests on a resilient lower seal 16 positioned within a groove 17 formed in the upper surface of the lower section 12. After the window assembly 10 is suitably positioned on the seal 16 of the lower mold section 12, the upper mold section 13 is lowered into position to enable the outer peripheral portions of the facing surfaces 18 and 19 of the cooperating mold sections 12 and 13 respectively to be clamped in metal-to-metal contact, as shown in FIG. 1. The upper mold section 13 carries a resilient upper seal 20 positioned in a groove 21 formed opposite the groove 17. The upper seal 20 cooperates with the lower seal 16 to press yieldingly against the glass sheet window assembly 10 and resiliently support the window assembly within the glass clearance chamber.

The chamber or space between the surfaces of the recessed portions 14 and 15 is slightly larger than the thickness of the window assembly 10. However, it will be appreciated that the glass clearance chamber can be formed of any shape as long as the chamber is sufficiently large to avoid any glass-to-metal contact between the glass sheets of the window assembly 10 and the metallic mold sections 12 and 13. For example, the portions of the mold sections 12 and 13 which are below and above respectively the central portion of the glass sheet window assembly 10 can be removed such that each mold section will be generally ring-shaped. The seals 16 and 20 are preferably formed of a silicone rubber material and secured within the respective grooves 17 and 21 by means of a suitable adhesive.

In addition to resiliently supporting the window assembly 10 within the glass clearance chamber, the seals 16 and 20 cooperate with selected portions of the window assembly 10 and the mold sections 12 and 13 for defining a gasket forming cavity utilized to form a gasket 22 about the peripheral edge of the window assembly 10. More specifically, in FIG. 1, the gasket forming cavity is defined by the cooperation of a lower gasket shaping surface 23 of the lower mold section 12, an upper gasket shaping surface 24 of the upper mold section 13, portions 16a and 20a of the seals 16 and 20 respectively, and the peripheral edge portion of the window assembly 10. The gasket forming cavity can be constructed to form the gasket 22 on either the entire periphery of the window assembly 10, or on a selected peripheral portion. Once the mold sections are closed, a flowable polymeric gasket forming material can be injected into the cavity through suitable inlet means (not shown).

Figure 2:
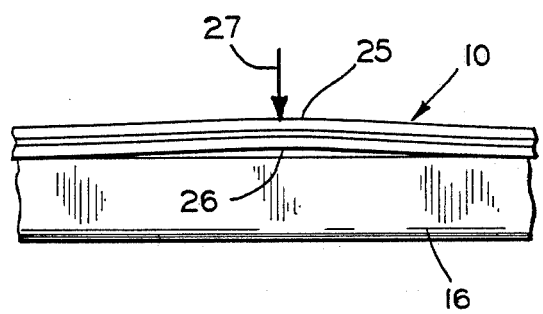
FIG. 2 is a fragmentary elevational view of the prior art window assembly and seal of FIG. 1.

Referring to FIG. 2, there is shown an elevational view of a portion of the window assembly 10 and the lower seal 16. While the seal 16 is ideally constructed with a contour which conforms to the contour of the edge of the window assembly 10, due to the normal glass forming and bending operations, the window assembly often has a contour which is slightly different from the contour of the seal 16. In FIG. 2, there is shown at 25 a difference in contour between a peripheral edge portion of the window assembly 10 and an upwardly facing portion of the seal 16. The lower surface of the window assembly 10 in the area 25 is spaced upwardly from the seal 16 when the window assembly is placed in the upper surface of the seal 16. The contour difference 25 forms a space or gap 26 which, prior to the injection of the gasket forming material, must be sealed in order to prevent leakage of the gasket forming material past the seal 16, thereby producing undesirable flash on the finished gasket.

When the upper mold section is placed on the top of the window assembly 10, pressure is applied in the direction of an arrow 27. The gasket 16 will tend to deform by compressing in the regions on either side of the gap 26 and, if enough pressure is applied, the region of the gasket 16 adjacent the contour difference area 25 will contact the facing surface of the window assembly 10 to eliminate the gap 26. However, when such contact occurs, relatively little pressure is applied to the seal 16 by the area 25 of the window assembly 10, thereby increasing the possibility of a blowout which will allow leakage of the gasket forming material and prevent fill-out resulting in an incomplete gasket. In addition, the regions of the seal 16 on either side of the gap 26 are subjected to increased pressure which causes increased seal fatigue and results in premature seal failure. Further, if the increased pressure is excessive, breakage of the window assembly can occur.

Figure 3:
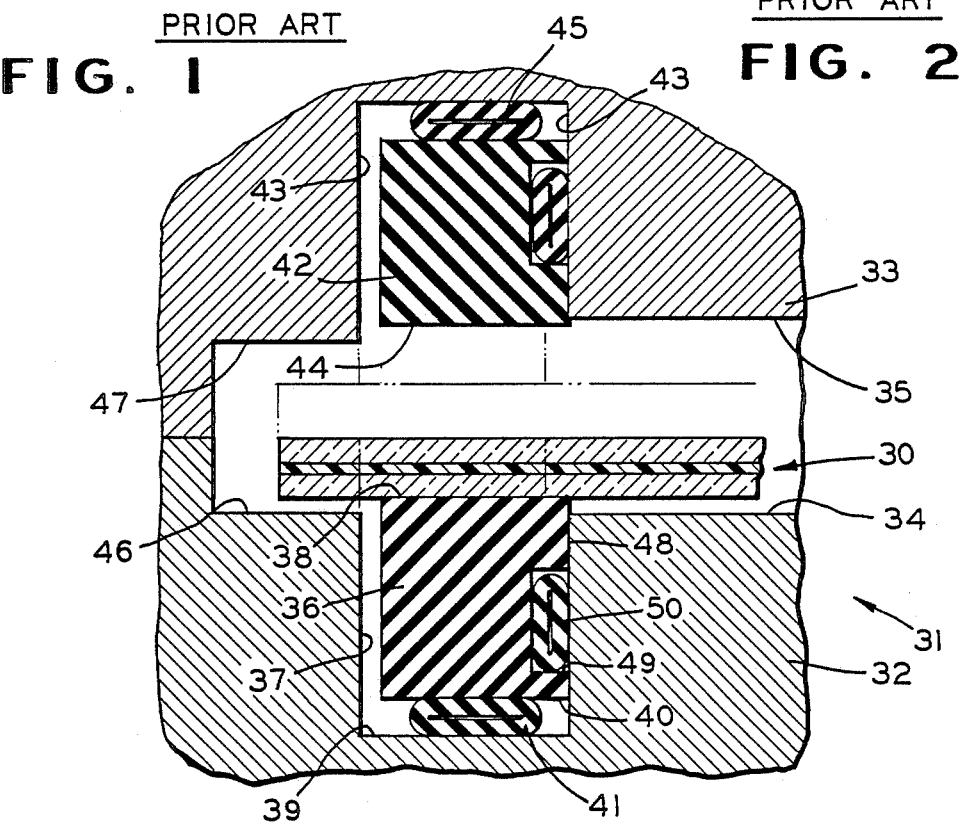
FIG. 3 is a fragmentary sectional view of a window assembly and mold structure incorporating a seal assembly in accordance with the present invention.

There is shown in FIG. 3 a seal assembly according to the present invention. A window assembly 30, similar to the window assembly 10, is positioned in a mold 31 having a lower section 32 and an upper section 33. The mold sections 32 and 33 are typically formed of a metallic material and have recessed portions 34 and 35 respectively to form a chamber for receiving the window assembly 30 and preventing glass-to-metal contact between the window assembly and the mold sections. A lower seal body 36, constructed of a deformable, non-compressible material such as silicone, is positioned in a groove 37 and has an upper or first sealing surface 38 which engages a lower surface of the window assembly 30 to support the window assembly above the lower section 32. The groove 37 has opposed side walls and an upwardly facing bottom wall 39. The seal 36 has a downwardly facing second surface 40 abutting a first tubular bladder 41 which rests on the bottom wall 39.

An upper seal body 42 constructed of material similar to the lower seal body 36 is located in a groove 43 formed in the upper section 33 and has a downwardly facing sealing surface 44 for engaging the window assembly 30. A tubular bladder 45 is positioned between an upper surface of the upper seal 42 and the bottom wall of the groove 43. The seal body 42 and the first bladder 45 are retained in the groove 43 by any suitable means such as adhesive. The lower section 32 and the upper section 33 have a lower cavity 46 and an upper cavity 47 respectively formed therein for forming a gasket which is similar to the gasket 24 in FIG. 1.

The lower seal body 36 has a side wall 48 adjacent the recessed portion 34 of the lower mold section 32. A longitudinally extending groove 49 is formed in the side wall 48 for retaining a second tubular bladder 50. A similar second bladder is associated with the seal body 42. As will be discussed below, the first and second bladders associated with each seal body can be inflated to force the seal bodies 36 and 42 against the side walls of the grooves adjacent the lower cavity 46 and the upper cavity 47 and position the window assembly 30, as shown in phantom lines, thereby sealing against entry of gasket forming material into the cavity 37 and the cavity 43.

Figure 4:
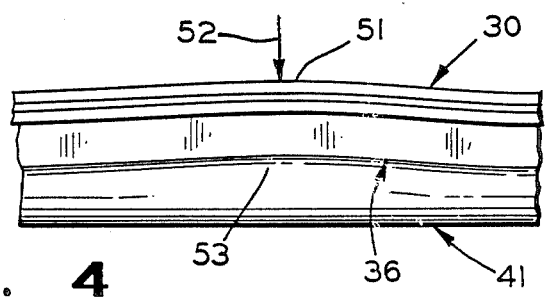
FIG. 4 is a fragmentary elevational view of the window structure and seal assembly shown in FIG. 3.

Referring to FIG. 4, there is shown a fragmentary elevational view of the window assembly 30, the lower seal 36 and the lower tubular bladder 41. A contour difference 51 in the window assembly 30 is similar to the contour difference 25 of the window assembly 10 shown in FIG. 2. However, pressure from the upper section of the mold in the direction of an arrow 52 tends to compress the bladder 41 on either side of the contour difference section 51, thereby displacing the fluid inside the bladder 41 toward the region beneath the contour difference section 51. The bladder 41 tends to expand in a region 53 to raise the lower seal 36 into contact with the lower surface of the window assembly 30 in the area of the contour difference 51. Thus, the dynamic seal according to the present invention automatically compensates for pressure differentials caused by contour differences and transfers compressive forces from "low spots" to "high spots". Therefore, the seal 36 is stressed evenly and tends to last longer and seal more reliably than the prior art seals shown in FIG. 1 and FIG. 2 and assures fill-out and undistorted gasket shape.

Typically, the upper and lower seals extend around those portions of the window periphery to which the gasket is to be molded. The associated bladder can be filled with a predetermined amount of fluid and subsequently sealed. If the gasket is to be formed around the entire periphery, the upper and lower seals in the mold will be formed as rings. The bladder under the seals will also be formed as a ring. However, the bladders are limited to a minimum radius corner due to wall thickness and material flexibility. In some instances, the ends of two bladders must be abutted at a corner in a groove such that the ring can be formed. Obviously the bladder 50 in FIG. 3 can be formed around a smaller radius in a horizontal plane than can the bladder 41.

Figure 5:
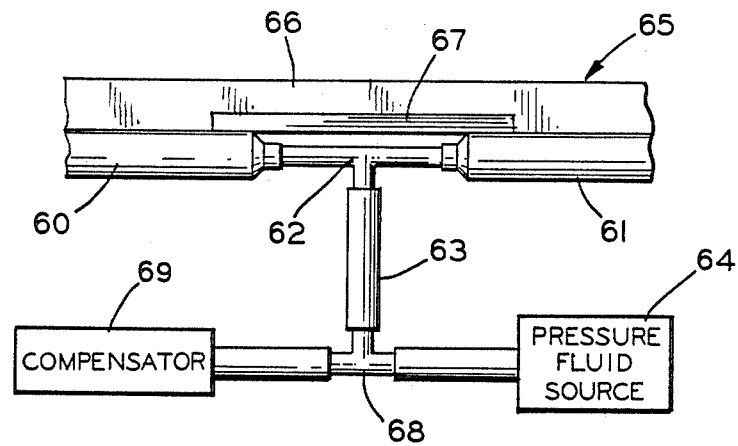
FIG. 5 is a partial schematic, partial fragmentary elevational view of a seal assembly and bladder operating system according to the present invention.

In instances where it is desirable to control the pressure of the fluid within a ring-shaped bladder, the interior of the bladder can be connected to a source of pressurized fluid in a manner as illustrated in FIG. 5. In FIG. 5, the bladder has spaced apart ends 60 and 61 which are connected to opposite ends of the cross portion of a "T" fitting 62. The upright portion of the "T" fitting 62 is connected to a supply line 63 which in turn is connected to a pressure fluid source 64.

A seal 65 supported by the bladder will tend to have a dead zone 66 in the unsupported area between the bladder ends 60 and 61. A bridge 67 formed from a rigid material can be inserted in the lower surface of the seal 65 in the dead zone 66. The ends of the bridge 67 are supported by the ends of the bladder 60 and 61 and the pressure applied by the window assembly (not shown) to the seal 65 in the dead zone 66 will be evenly distributed by the bridge 67.

Many types of fluid can be utilized to inflate the bladder. For example, a relatively non-compressible liquid such as oil could be utilized to fill the bladder. If a compressible gas is utilized, the pressure fluid source could be a source of pressurized gas at a relatively higher pressure and include a pressure regulator which could be set to provide the desired pressure to the bladder. Should the molds and seals have a tendency to pose too high a pressure on the bladder, a compensator can be provided. For example, the supply line 63 can be connected to the stem of a "T" fitting 68. A cross portion of the "T" fitting 68 can have its ends connected to the pressure fluid source 64 and to a compensator 69. The compensator 69 can include a nitrogen filled bag inside a steel cylinder such that excess pressure on the gas in the bladder will tend to compress the nitrogen filled bag and reduce the pressure in the bladder.

Figure 6:
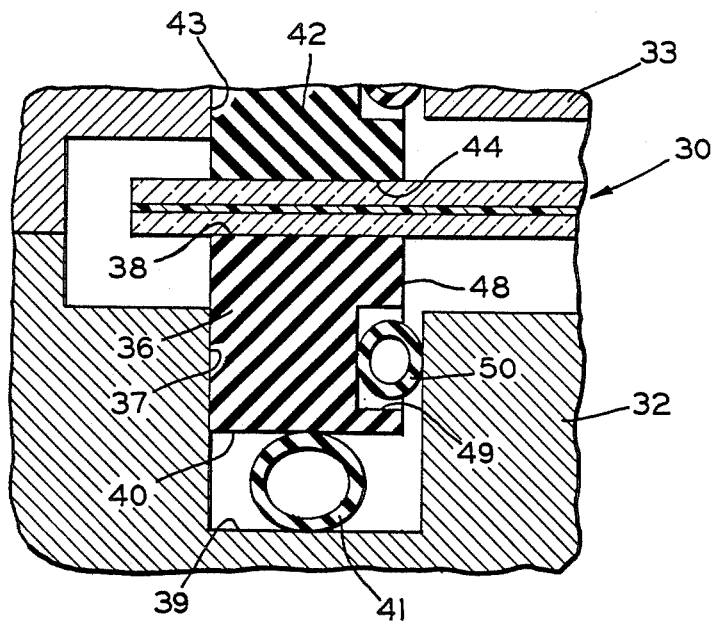
FIG. 6 is a fragmentary sectional view of the seal assembly shown in FIG. 3 in an inflated operating condition.

There is shown in FIG. 6 the lower seal 36 of the present invention in the sealed position. The first tubular bladder 41 is filled with a suitable fluid which tends to increase its height and force the lower seal body upwardly in the groove 37. Similarly, the first tubular bladder 45 (not shown in FIG. 6) is filled with fluid to force it downwardly in the upper groove 43. Thus, the sealing surfaces 38 and 44 are forced against the outer surfaces of the window assembly 30 to seal against passage of the gasket forming material. Of course, the difference between the deflated height of the first tubular bladder and the inflated height of such bladder is the maximum distance that the seal body can move in the groove. Next, the second tubular bladder 50 and the corresponding upper second tubular bladder associated with the upper seal body 42 are inflated to force the seal bodies 36 and 42 respectively against the side walls of the grooves 37 and 43 respectively to seal against entry of the gasket forming material from the lower cavity 46 and the upper cavity 47.

Figure 7:
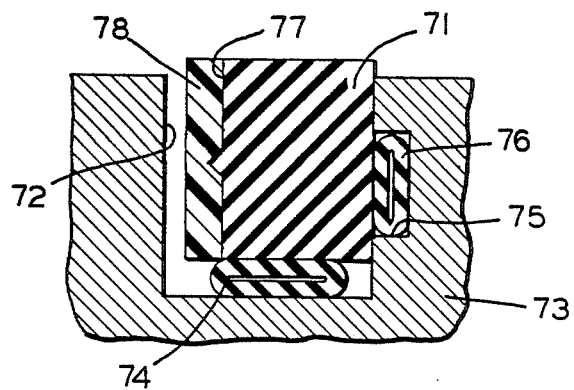
FIG. 7 is a fragmentary sectional view of an alternate embodiment of the seal assembly according to the present invention.

There is shown in FIG. 7 an alternate embodiment of the present invention. In this embodiment, a seal 71 is retained in a groove 72 formed in a mold section 73. The seal 71 rests on a first tubular bladder 74. Formed in a wall of the groove 71 is an aperture 75 which retains a second tubular bladder 76. The tubular bladder 74 functions in a manner similar to the tubular bladder 41 shown in FIG. 3 and the tubular bladder 76 functions in a manner similar to the tubular bladder 50.

A side wall 77 of the seal 71 opposite the aperture 75 has a longitudinally extending plastic strip 78 attached thereto. The strip 78 can be formed of any suitable material such as Teflon synthetic resin polymer and will abut a facing side wall of the groove 72 when the second tubular bladder 76 is inflated. The strip 78 serves several purposes. It prevents the gasket forming material from sticking to the seal 71 which could tend to tear the gasket forming material when the window assembly and the gasket are removed from the mold. Furthermore, the strip 78 provides a reduced friction surface between the groove 72 and the seal body 71 to facilitate movement of the seal body upwardly and downwardly in the groove 72 during the molding operation. Finally, the strip 78 also protects the surface of the seal body 71 from wear which would occur from sliding movement in the groove 72. Also, in some instances only one dynamic seal is required and the other seal could be of the static type as shown in FIG. 1 or the strip 78 used above. Typically, the static seal is used in the upper mold section.

It has been found that quite satisfactory results are achieved by utilizing a reinforced braided flat hose material for the bladders 74 and 76. These bladders 74 and 76 will tend to "round out" when coupled to a source of pressure fluid such as water, for example, and will not tend to increase in length during use. It will be appreciated that increases in length of the bladders 74 and 76 would tend to cause undesired binding in the associated molds.

The embodiments of the invention illustrated in FIG. 3 and FIG. 7 effectively eliminate the necessity of close tolerances for the seal and the associated groove or channel to prevent material from entering the groove. Also, the structure eliminates the requirement for any auxiliary means for maintaining the hoses or bladders in the channel or groove.

In each of the embodiments of the present invention, a seal for sealing between a window assembly and a mold section to define a gasket forming cavity includes a fluid-filled bladder means. The seal and the bladder means function together as a dynamic seal to automatically compensate for pressure differentials created by contour differences in the window assembly.

In accordance with the provisions of the patent statutes, the principle and mode of operation of the present invention have been described in what has been considered to represent the preferred embodiment. However, it should be understood that the invention may be practiced otherwise than as specifically illustrated and described without departing from the scope of the attached claims.

What is claimed is:

1. A seal assembly for a mold for encapsulating at least a portion of a window assembly with a gasket forming material comprising;
    sealing means having a first surface adapted to contact a window assembly and a second surface opposite said first surface;
    a first bladder means in contact with said second surface of said sealing means whereby when said sealing means and said first bladder means are positioned in a groove in a mold and said first bladder means is inflated and pressure is applied in a local area of said first surface, said bladder means automatically deforms to transfer at least a portion of said pressure to an adjacent area of said first surface of said sealing means;
    said sealing means having a third surface generally perpendicular to said first surface adapted to contact a wall in a mold and a fourth surface opposite said third surface; and
    a second bladder means in contact with said fourth surface of said sealing means whereby when said sealing means and said second bladder means are positioned in a groove in a mold and said second bladder means is inflated, said third surface of said sealing means cooperates with said wall of the mold to seal against passage of gasket forming material.

2. The seal assembly according to claim 1 wherein said first and second bladder means are filled with a fluid.

3. The seal assembly according to claim 2 wherein said fluid is a liquid.

4. The seal assembly according to claim 2 wherein said fluid is a gas.

5. The seal assembly according to claim 2 wherein said fluid is under pressure.

6. The seal assembly according to claim 1 including a source of pressure fluid connected to said first and second bladder means.

7. The seal assembly according to claim 6 including a pressure compensator means connected to said first and second bladder means.

8. The seal assembly according to claim 1 wherein said sealing means has a groove formed in said fourth surface for retaining said second bladder means.

9. The seal assembly according to claim 1 wherein said first bladder means is tubular in cross-section when inflated.

10. The seal assembly according to claim 1 wherein said second bladder means is tubular in cross-section when inflated.

11. The seal assembly according to claim 1 wherein said first and second bladder means are formed of a reinforced braided flat hose material.

12. The seal assembly according to claim 1 wherein said third surface of said sealing means is formed of a strip of Teflon material.

13. The seal assembly according to claim 1 wherein said second bladder means is adapted to be retained in an aperture formed in a wall of a groove in a mold.

14. A seal assembly for a mold for encapsulating at least a portion of a window assembly with a gasket forming material comprising:
    a sealing body having a first sealing surface adapted to contact a surface of a window assembly, a first opposed surface opposite said first sealing surface, a second sealing surface adjoining said first sealing surface and adapted to contact a wall of a groove in a mold, and a second opposed surface opposite said second sealing surface; and bladder means including a first bladder means adapted to be positioned between said first opposed surface and a wall of a groove in a mold whereby when said first bladder means is inflated and pressure is applied in a local area of said first sealing surface, the pressure is transmitted through said sealing body to said first bladder means which deforms to transfer at least a poriton of the pressure to an adjacent area of said first sealing surface, and including a second bladder means adapted to be positioned between said second opposed surface and a wall of a grooove in the mold.

15. The seal assembly according to claim 14 including a source of pressure fluid connected to said first and second bladder means.

16. The seal assembly according to claim 15 including a pressure compensator means connected to said first and second bladder means.

17. The seal assembly according to claim 14 wherein said sealing body includes a strip of Teflon material as said second sealing surface for contacting a wall of a groove in a mold to prevent gasket forming material in the mold from flowing past said sealing body.

18. A seal assembly for use in a mold for encapsulating the periphery of a window assembly with a gasket forming material, the seal assembly comprising:

a sealing body formed as a ring adapted to be retained in a groove in a mold and having a first sealing surface adapted to contact a surface of a window assembly, said sealing body cooperating with a mold for defining an encapsulation gasket forming cavity;

a first bladder means spaced from said first sealing surface and adapted to be positioned in the mold whereby when said first bladder means in inflated and pressure is applied in a local area of said first sealing surface, the pressure is transmitted through said sealing body to deform said first bladder means and transfer at least a portion of the pressure to an adjacent area of said first sealing surface;

said sealing body having a second sealing surface adjacent said first sealing surface and adapted to contact a side wall of a groove formed in the mold; and a second bladder means spaced from said second sealing surface whereby when said second bladder means is inflated, said second sealing surface is forced into contact with a side wall of a groove in the mold to prevent gasket forming material in the mold from flowing past said sealing body.

19. The seal assembly according to claim 18 wherein said first bladder means is positioned between said sealing body and a wall of a groove in a mold and is generally tubular in cross-section.

20. The seal assembly according to claim 19 wherein said first bladder means is formed as a discontinuous ring with a pair of ends connected to a source of pressure fluid and wherein said sealing body includes a rigid bridge means bridging a gap between said first bladder means ends for transferring any pressure applied to said first sealing surface in the area adjacent said gap to said first bladder means.

21. The seal assembly according to claim 18 wherein said second sealing surface is formed as a longitudinally extending strip of Teflon material.

22. The seal assembly according to claim 18 wherein said sealing body is a first sealing body and including a second sealing body formed as a ring adapted to be retained in a groove in a mold and having a first sealing surface adapted to contact a surface of a window assembly, said first and second sealing bodies cooperating with a mold for defining an encapsulation gasket forming cavity.

23. The seal assembly according to claim 18 wherein said sealing body has a longitudinally extending aperture formed therein for retaining said second bladder means.

24. The seal assembly according to claim 18 wherein said second bladder means is adapted to be retained by an aperture formed in a side wall of a groove in the mold.

* * * * *

UNITED STATES PATENT AND TRADEMARK OFFICE
CERTIFICATE OF CORRECTION

PATENT NO. : 4,732,553
DATED : March 22, 1988
INVENTOR(S) : Peter H. Hofer

It is certified that error appears in the above-identified patent and that said Letters Patent are hereby corrected as shown below:

Column 9, line 5, "of" should read --defining--; same line, "whereby" should read --such that--; line 6, after "inflated" insert --in the mold--; line 10, "poriton" should read --portion--; line 12, delete "adapted to be"; line 13, "between" should read --next to--; line 14, "and" should read --for disposition against--; same line, "of" should read --defining--; same line, after "mold" insert --to press said second sealing surface against said wall--; line 37, "in" should read --is--;

Column 10, line 6, "whereby" should read --and positioned such that--; line 7, after "inflated" insert --in a mold--; same line, "is" should read --will be--; line 8, "of" should read --defining--.

Signed and Sealed this

Twenty-seventh Day of September, 1988

*Attest:*

DONALD J. QUIGG

*Attesting Officer*  *Commissioner of Patents and Trademarks*